April 6, 1948. E. ABRAHAMSON 2,438,958
VIBRATION ACTUATED INDICATOR
Filed Aug. 31, 1945 2 Sheets-Sheet 1
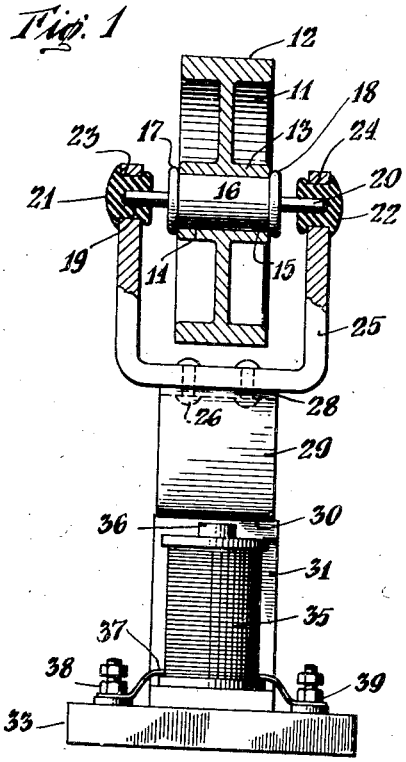
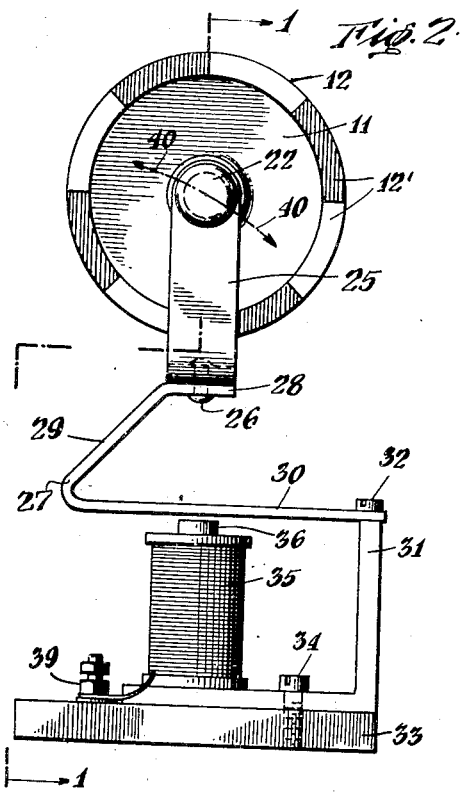
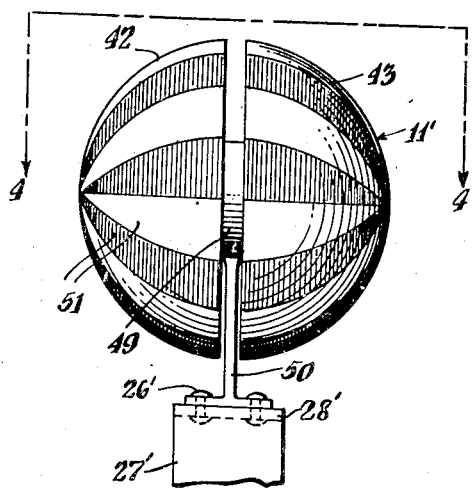
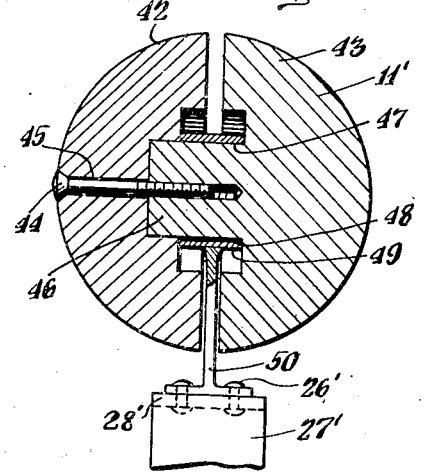
INVENTOR
Edmund Abrahamson
BY Albert M. Austin
his ATTORNEY April 6, 1948. E. ABRAHAMSON 2,438,958
VIBRATION ACTUATED INDICATOR
Filed Aug. 31, 1945 2 Sheets-Sheet 2
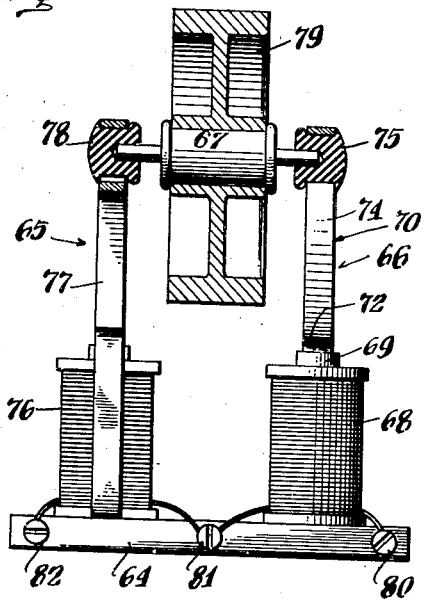
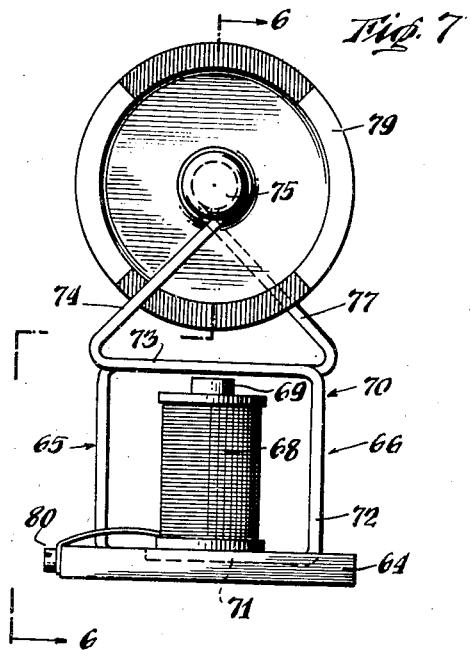
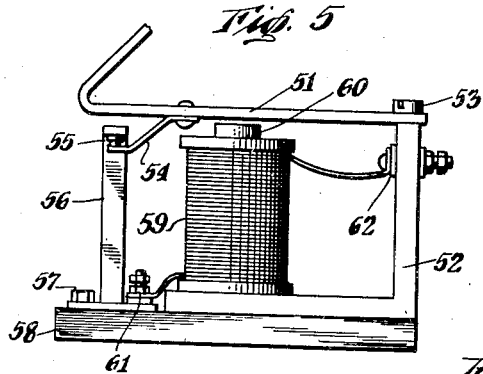
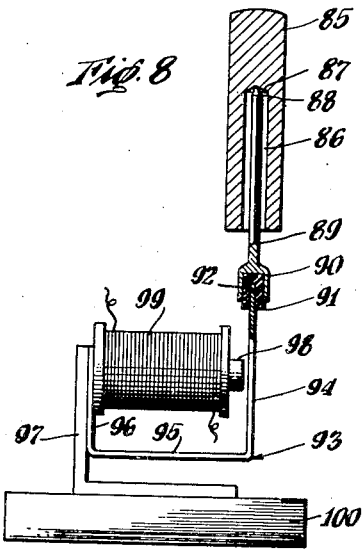
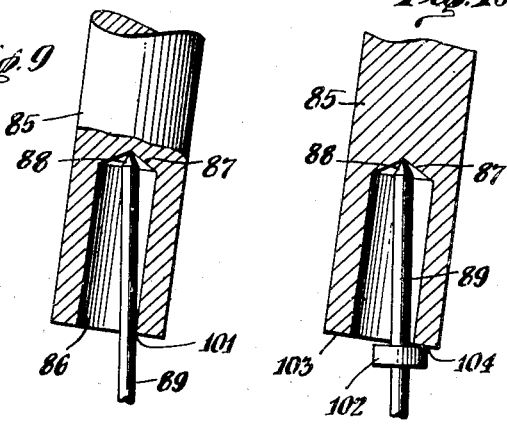
INVENTOR
Edmund Abrahamson
BY Albert M. Austin
his ATTORNEY Patented Apr. 6, 1948

2,438,958

UNITED STATES PATENT OFFICE 2,438,958

VIBRATION ACTUATED INDICATOR

Edmund Abrahamson, Baldwin, N. Y.

Application August 31, 1945, Serial No. 613,778

10 Claims. (Cl. 177—329)

This invention provides a rotary device, which, among numerous other uses, has particular application to the field of signaling devices.

Referring to the specific application of the invention of signaling devices, the invention provides an electrical rotary indicator which is extremely simple of construction and requires very little energy to operate. The device includes a rotor of optional shape generally of the form of a cylinder, a wheel or a sphere. Upon actuation of the device, the rotor spins about in an axis in a predetermined direction at a predetermined rate. Being movable, it catches the eye much more readily than a steady signal light or other form of static signal.

The rotor of the device is spun by a vibratory energy. It is mounted for movement about a spin axis on a vibratory support and is excited in a suitable manner for example, by an electric magnet or a solenoid. The rotor is provided with a suitable bearing surface supported on a complementary bearing surface of the supporting member with a slight amount of play so as to turn freely. The vibratory support may be formed by the armature of an electromagnet or a solenoid. It is so mounted and formed as to be capable of vibration when the magnet is energized. However, the support may also be non-magnetic for example, it may be a membrane band or diaphragm capable of vibration, the rotor being supported thereon by a fixed or movable simple bracket or other support, partly or entirely made of magnetic material. It will be readily understood that the magnet may be of the alternating or direct current type, in the latter instance a suitable interrupter being provided as are commonly found in electric doorbells and buzzers.

The vibration of the support, the gravity acting on the rotor and its inertia cooperate to produce a substantially continuous frictional torque in the bearing upon the rotor causing the rotor to spin in the same manner as if the rotor were driven by a motor.

The amount of energy required for operating the device is exceedingly small. This makes indicators according to the invention suited for use in connection with zero indicating measuring arrangements for example, Wheatstone bridges, and make it also valuable in the communication field, for example, telephone systems, where conspicuous signals are desirable.

The various features, objects and advantages of the invention as well as structural details of preferred forms of the invention will appear more fully from the detailed description which follows accompanied by drawings showing for the purpose of illustration, specific examples of the invention as applied to signaling devices.

The invention also consists in certain new and original features of construction and combination of parts hereinafter set forth and claimed.

Although the characteristic features of the invention which are believed to be novel will be particularly pointed out in the claims appended hereto, the invention itself, its objects and advantages, and the manner in which it may be carried out may be better understood by referring to the following description taken in connection with the accompanying drawings forming a part of the description in which Fig. 1 is a front view, partly in section, of a signal device according to this invention, a section being taken on line 1—1 in Fig. 2;

Fig. 2 is a side view of the device shown in Fig. 1;

Fig. 3 is a front view of a modified form of spherical indicator rotor which may be used in the device of Figs. 1 and 2;

Fig. 4 is a section of the rotor shown in Fig. 3, a section being taken on line 4—4 of Fig. 3;

Fig. 5 is a fractional view of a modified form of actuator for the signal device of Fig. 1 for operation by direct current;

Fig. 6 is a front view, partly in section, of a reversible rotary indicator, a section being taken on line 6—6 in Fig. 7;

Fig. 7 is a side view of the indicator shown in Fig. 6;

Fig. 8 is a side view, partly in section, of a modified form of indicator having a rotor spinning about a vertical axis;

Fig. 9 is a fractional view illustrating the drive of the rotor of the device of Fig. 8; and Fig. 10 shows a modified form of drive which may be incorporated in the device of Fig. 8.

In the following description and in the claims various details will be identified by specific names for convenience. These names however are intended to be as generic in their application as the art will permit. Like reference characters refer to like parts in the several figures of the drawing.

In the drawings accompanying and forming part of the specification, certain specific disclosure of the invention is made for the purpose of explanation, but it is understood that details may be modified in various respects without departure from the broad aspects of the invention.

The indicator illustrated in Figs. 1 and 2 comprises a rotor 11 having on its rim 12 suitable markings 12' such as alternating black and white fields or other indicia to make rotation of the rotor more easily apparent. The hub 13 of the rotor has an inner bearing surface 14 supported on a complementary outer bearing surface 15 of an axis 16.

The axis 16 has two flanges 17 and 18 to limit axial movement of the rotor and terminal studs 19 and 20 held against rotation by bushings 21 and 22. The bushings 21 and 22 are of vibration damping material such as rubber, felt, cork, fiber or the like.

The bushings are held in suitable apertures 23 and 24 in the ends of a U-shaped supporting member 25 secured at 26 to a spring 27.

The spring constitutes a vibratory support for the member 25 and the rotor axis 16 and comprises a substantially flat top portion 28 to which the supporting member 25 is secured, an oblique portion 29 and a substantially horizontal portion 30 secured with its end to a bracket 31 at 32.

The bracket 31 is L-shaped and secured to a base 33 by screws 34. It is preferably made of soft iron and carries an electromagnet 35 on a core 36. The winding 37 of the electromagnet has terminals 38 and 39 for connection of the indicator in a circuit.

The rotor 12 may be made of any suitable material. It may be metal, plastic, wood or any other material or composition. Likewise the axis 16 may be made of metal or non-metallic material. The bearing surfaces 14, 15 should have a certain amount of play so as to permit the rotor to turn freely. The surfaces of the bearing should provide a certain amount of friction and are for this reason preferably kept free from lubricants.

The outer bearing surface 15 may be artificially roughened by sand blasting or knurling although this is not essential, the friction normally occurring between smooth surfaces of a plastic rotor and a metal axis being sufficient.

The spring 27 and the bracket 31 are of magnetic material to provide a path for the magnetic flux of the electromagnet 35 the flux circuit being the core 36, bracket 31, horizontal portion 30 of the spring 27 and the air gap between the spring and the core.

The spring 27 securely held at 32 and carrying the axis and the rotor assembly on its free end constitutes a vibratory armature capable of vibrating about the mounting 32 when the electromagnet 35 is energized by an alternating current.

In the illustrated position of the instrument a vibration is imparted to the rotor axis 16 in a direction indicated in approximation by arrows 40, the exact path of travel of the axis being somewhat more complicated due to the compound vibration of the spring comprising a vibration of the horizontal portion 30 about 32 and a vibration of the oblique portion 29 with respect to the horizontal portion 30.

The rotor tends to resist the vibratory movement due to its own inertia and is furthermore under influence of gravity tending to keep the rotor in a position in which the bearing surfaces contact at the topmost portion, the play of the bearing being at the bottommost point.

As a result of the vibration, inertia, and gravity the rotor 11 is shaken with respect to its axis 16 whereby a frictional torque is set up causing the rotor to spin.

It is advantageous, although not necessary, to tune the spring 27 to resonance with the frequency of the A. C. energizing the magnet 35.

The shock absorbing bushings 21 and 22 are not indispensable to the operation of the instrument but improve its performance by suppressing stray outside shocks and vibrations resulting in smoother rotation of the rotor. The bushings further tend to make the instrument independent from the position in which it is operated while without the bushings the instrument will perform less satisfactory in some positions than in others.

The bushing should be arranged between the spring or other vibratory support and the rotor axis proper, the most advantageous location being as close to the rotor axis as possible.

The form of the rotor is entirely optional. Figs. 3 and 4 illustrate a modified form of rotor in the shape of a sphere. The rotor 11' consists of two halves 42 and 43 held together by a screw 44 extending through a bore 45 of the half sphere 42 into the central portion 46 of the other half of the sphere. The central portion 46 provides an outer bearing surface 47 resting in the inner bearing surface 48 of a cylindrical bearing 49. The cylindrical bearing 49 is mounted on a post 50, secured to the upper portion 28' of the spring 27' at 26'. The spherical rotor may likewise be provided with suitable markings 51 to make its rotation more easily apparent.

The rotors of the illustrated form of indicator actuated by a single electromagnet or solenoid will normally turn in one direction only. However, it is very often possible to reverse the direction of rotation by applying a higher voltage to the electromagnet or by reducing the voltage to a certain critical amount. In practical operation this may be accomplished by providing a resistor in the circuit which may be shunted at will.

The power requirement of the indicator is very small and a current of the order of 1 milliamp is normally sufficient to operate it.

Fig. 5 illustrates the operating part of an indicator operable by direct current. The vibratory support for the indicator and axis assembly (not shown) comprises a spring 51 mounted to a bracket 52 at 53. A contact element 54 on the spring 51 cooperates with a further contact piece 55 on a post 56 having a post terminal 57. The post 56 is mounted on a base 58 to which also the bracket 52 is secured. An electromagnet 59 and soft iron core 60 are mounted on the bracket at 53, the ends of the winding of the electromagnet 59 being connected to a terminal 61 and a point 62 on the bracket 52 respectively.

When direct current is applied to the terminals 57 and 61 the device will operate as a self-interrupter in the same manner as the conventional doorbell or buzzer and the vibrations of the spring 51 will cause the indicator rotor to spin in the manner hereinbefore explained.

A reversible indicator whose rotor may be spun at will in one direction or the other is illustrated in Figs. 6 and 7. The illustrated device is for operation by alternating current, it being understood that the device may be modified for operation on direct current in accordance with the details shown in Fig. 5.

The reversible indicator comprises a base 64 carrying two vibratory assemblies 65 and 66 operating on a common rotor axis 67.

The assembly 66 comprises an electromagnet 68 on a core 69. A spring 70 is bent to form a base portion 71 and upright portion 72, a horizontal portion 73 and an oblique portion 74 carrying at its end a bushing 75 in which one end of the rotor axis 67 is held against rotation.

The assembly 65 likewise comprises an electromagnet 76 having as an armature a spring 77 of the same shape as the spring 70, the only difference being that the spring 77 is mounted in reversed position with respect to the spring 70. The spring 77 supports a second vibration damping bushing 78 supporting the other end of the rotor axis 67 on which an indicator rotor 79 is mounted.

One end of the winding of the electromagnet 68 leads to a terminal 80, the other end leads to a common terminal 81 to which also one end of the winding of the electromagnet 76 is connected. A further terminal 82 is provided for the other end of the winding of the electromagnet 76.

The operation of the device is as follows: When an E. M. F. is applied to the terminals 80 and 81, the assembly 66 will be energized causing the spring 70 to vibrate. The vibrations are transmitted to one end of the rotor axis 67 resulting in rotation of the rotor in one direction. The other end of the rotor axis is substantially at rest, the assembly 65 being at rest.

If an E. M. F. is applied to the terminals 81 and 82, the assembly 65 will operate applying vibration to the rotor shaft 67 through the bushing 78. The result is a rotation of the rotor in the opposite direction by reason of the reversed mounting of the spring 77 with respect to the spring 70. If both assemblies 65 and 66 are energized to the same extent, the indicator rotor will come to rest, because the frictional torques set up by assemblies 65 and 66 are equal and oppositely directed.

The invention is not limited to devices having a substantially horizontal spin axis. It may also be applied to devices in which the spin axis is vertical. Fig. 8 illustrates a simple form of indicator having a vertical spin axis.

An indicator rotor 85 of substantial cylindrical shape has a bore 86 providing a rotor bearing 87 engaged by the point 88 of a pin 89. The lower end of the pin 89 is secured to a cup 90 in which a bushing 91 of vibration damping material such as rubber, cork, felt, leather or fiber is contained.

The end 92 of a vibratory armature 93 extends into the bushing 91 and supports the pin 89 in a substantially vertical position. The armature 93 is a spring of magnetic material comprising a vertical portion 94, a horizontal portion 95 and a base portion 96 secured to a supporting bracket 97. A core 98 of an electromagnet 99 extends from the base portion 96 of the armature and cooperates with the vertical portion 94 of the spring.

The supporting bracket 97 is mounted on a base 100. When the electromagnet 99 is energized by an alternating current, the armature 93 will vibrate the pin 89. Due to its own inertia the end of the bore 86 will make frictional contact with the supporting pin 89 at a point 101 as is shown in Fig. 9 on an enlarged scale. The point of frictional engagement constantly varies under the vibration causing a frictional torque to be exerted on the indicator rotor 85 which spins the rotor about a substantially vertical axis.

Friction between the shaft and the pin 89 and the rotor 85 may be increased by a collar 102 of fiber or other suitable frictional material on the pin shaft 89, as shown in Figure 10. The collar cooperates with the bottom surface 103 of the rotor, the point of engagement being 104 in the illustrated embodiment.

Indicators according to the invention may be manufactured as relatively small compact instruments which after assembly may be sealed in a dust proof transparent enclosure and require no further servicing during the lifetime of the instrument. A particular feature of the invention is that the devices require no lubrication. Friction in the rotor bearings is desirable and any increase in the degree of friction during operation will improve the performance of the instrument rather than decrease it. The great sensitivity of the devices make the indicator particularly suited for use in zero indicating instruments such as Wheatstone bridges. The long life of the devices is a further advantage over indicators of other types, particularly indicator lamps. In addition the indicator has the advantage over a lamp of being more conspicuous.

While the invention has particular application to indicators, it is in no way limited thereto, but has many other uses. For example, the invention may be applied to the operation of rotary toys or models such as miniature machine tools since a number of individual rotors may be placed on the same support and receive their energy from the same vibrator or electromagnet.

Obviously the invention is not restricted to the particular embodiments herein shown and described. Various changes, additions, omissions, substitutions and modifications may be made without departure from the spirit of the invention. For example, the vibration dampening bushings may be omitted. The vibratory support may be made of non-magnetic material and separate magnetic supports for the rotor axis may be employed which are acted upon by the electromagnet. All such changes will suggest themselves to persons skilled in the art after perusal of this disclosure.

What is claimed is:

1. A movable indicator comprising, in combination, an electromagnet; an armature associated with said electromagnet, said armature being resiliently biased towards, and capable of vibrating about, a central portion; a first bearing member carried by said armature to be vibrated thereby; and an indicator having a second bearing member, said indicator being mounted for free rotation on said first bearing member, the frictional engagement between said bearing members being the means for converting vibratory motion of the armature into rotary motion of the indicator.

2. A movable indicator comprising, in combination, a source of vibration, an element resiliently biased towards, and capable of vibrating about a central position; a first bearing member; shock absorbing means for mounting said first bearing member on said vibrating element; and an indicator having a second bearing member, said indicator being mounted for free rotation on said first bearing member, the frictional engagement between said bearing members being the means for converting vibratory motion of said element into rotary motion of said indicator.

3. A movable indicator comprising, in combination, a source of vibratory energy; a vibratory armature having at least two portions extending at an angle with respect to each other, one of said portions being acted upon by said source of vibratory energy, the other portion being capable of resiliently vibrating about a central position towards which it tends to return by resiliency; a first bearing member on said other portion of said element; and an indicator having a second bearing member, said indicator being mounted for free rotation on said first bearing member, the frictional engagement between said bearing members being the means for converting vibratory motion of said armature into rotary motion of said indicator.

4. A movable indicator comprising, in combination, an electromagnet, a vibratory resilient armature having at least two portions extending at an angle with respect to each other, one of said portions being acted upon by said electromagnet, the other portions being capable of vibrating about a central position; a first bearing member on said other portion of said armature; and an indicator having a second bearing member, said indicator being mounted for free rotation on said first bearing member, the frictional engagement between said bearing members being the means for converting vibratory motion of said armature into rotary motion of said indicator.

5. A movable reversible indicator comprising, in combination, a first electromagnet; a first armature associated therewith, said armature being resiliently biased towards and capable of vibrating about, a central position; a second electromagnet; a second armature associated with said second electromagnet, said second armature being resiliently biased towards and capable of vibrating about, a central position, said first and second armatures being so mounted as to extend in opposite directions; a first bearing member connected to both said first and said second armature; and an indicator having a second bearing member frictionally engaging said first bearing member, said indicator being mounted for free rotation on said first bearing member, the frictional engagement between said bearing members being the means for converting vibratory motion of said armatures into rotary motion of said indicator, the direction of rotation of the indicator being determined by excitement of said first or said second electromagnet and armature, respectively.

6. A movable indicator comprising, in combination, two electromagnets; magnetic supporting means acted upon by said electromagnets, said supporting means being resiliently biased towards, and capable of vibrating about, a central position; a first bearing member connected to said supporting means to be vibrated thereby; and an indicator having a second bearing member, said indicator being mounted for free rotation on said first bearing member, the first frictional engagement between said bearing members being the means for converting vibratory motion of said supporting means into rotary motion of said indicator.

7. A movable indicator comprising, in combination, a rotary indicator having a bearing surface; a bearing member frictionally engaging the bearing surface of said indicator for free rotation of said indicator about a substantially horizontal spin axis; a support for said bearing member, said support being resiliently biased towards, and capable of vibrating about, a central position and having freedom of vibration about an axis of vibration substantially parallel to the spin axis; and a source of vibratory energy for exciting said support.

8. A movable indicator comprising, in combination, a rotary indicator having an axial bore; a substantially vertical pivot engaging the bore of said indicator, the indicator having freedom of tilt with respect to said pivot; an angular vibratory support for said pivot, said support being resiliently biased towards, and capable of vibrating about, a central position; and means for imparting vibration to said support.

9. A rotary device, particularly for use as an indicator, comprising, in combination, a first bearing member; a rotary element adapted to be visually observed having a second bearing member frictionally engaging said first bearing member for free rotation thereabout; means resiliently biased towards, and capable of vibrating about, a central position, said means supporting said first bearing member; and an electromagnet for imparting vibrations to said support.

10. A rotary device, particularly for use as an indicator, comprising, in combination, a first bearing member; a rotary element adapted to be visually observed having a second bearing member frictionally engaging said first bearing member for free rotation thereabout; a support for said first bearing member, said support being resiliently biased towards, and capable of vibrating about, a central position; a magnetic element associated with said support; and an electromagnet acting on said magnetic element for exciting said support into vibrations.

EDMUND ABRAHAMSON.

REFERENCES CITED

The following references are of record in the file of this patent:

UNITED STATES PATENTS

| Number | Name | Date |
|---|---|---|
| 476,463 | Hunter | June 7, 1892 |
| 495,913 | Savage, Jr. | Apr. 18, 1893 |
| 1,142,650 | Wilhelm | June 8, 1915 |
| 1,189,076 | Eisendrath et al. | June 27, 1916 |
| 2,302,421 | Cristofoli | Nov. 17, 1942 |
| 2,388,531 | Deal | Nov. 6, 1945 |